(12) United States Patent
Meloch et al.

(10) Patent No.: US 10,207,906 B2
(45) Date of Patent: Feb. 19, 2019

(54) LIFTING ASSEMBLY FOR A LIFT TRUCK, AND LIFT TRUCK

(71) Applicant: Jungheinrich Aktiengesellschaft, Hamburg (DE)

(72) Inventors: Piotr Meloch, Henstedt-Ulzburg (DE); Kai Fischer, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 15/048,266

(22) Filed: Feb. 19, 2016

(65) Prior Publication Data

US 2016/0244309 A1  Aug. 25, 2016

(30) Foreign Application Priority Data

Feb. 20, 2015 (DE) .......... 10 2015 102 402

(51) Int. Cl.
*B66F 9/08* (2006.01)
*F16H 7/08* (2006.01)
*B66F 9/07* (2006.01)

(52) U.S. Cl.
CPC .......... *B66F 9/08* (2013.01); *B66F 9/07* (2013.01); *F16H 7/08* (2013.01)

(58) Field of Classification Search
CPC .......... B66F 9/07; B66F 9/08; F16H 7/08
See application file for complete search history.

(56) References Cited

U.S. PATENT DOCUMENTS

| | | | | |
|---|---|---|---|---|
| 1,991,576 A | * | 2/1935 | Remde | B66F 9/08 187/226 |
| 2,601,789 A | * | 7/1952 | Riopelle | F16H 7/18 474/140 |
| 2,822,067 A | * | 2/1958 | Price | E04H 12/182 403/109.7 |
| 3,174,634 A | * | 3/1965 | Peck | B60P 1/4414 187/233 |
| 3,360,078 A | * | 12/1967 | Hopfeld | B66F 11/04 187/222 |
| 3,854,699 A | | 12/1974 | Garnett | |
| 4,552,250 A | * | 11/1985 | Luebrecht | B66B 9/187 182/141 |
| 5,266,066 A | * | 11/1993 | White | F16H 7/08 474/111 |
| 5,401,134 A | * | 3/1995 | Habicht | B66F 9/06 187/227 |
| 5,961,411 A | * | 10/1999 | Tsutsumi | F16H 7/18 474/111 |

(Continued)

FOREIGN PATENT DOCUMENTS

| | | |
|---|---|---|
| DE | 1750684 | 2/1971 |
| DE | 7707012 | 8/1977 |

(Continued)

*Primary Examiner* — Minh Truong
(74) *Attorney, Agent, or Firm* — Barclay Damon LLP (57) ABSTRACT

A lifting assembly for a lift truck with a lifting mast having at least one mast frame and a load part, as well as a lift drive having at least one lifting chain that lifts the mast frame, is attached to the mast frame at a connecting point and is guided across a deflection point. The lifting assembly includes at least one tensioning component that is arranged on the mast frame between the connecting point and deflection point of the lifting chain.

19 Claims, 5 Drawing Sheets

(56) References Cited

U.S. PATENT DOCUMENTS

| | | | | |
|---|---|---|---|---|
| 6,264,004 B1 * | 7/2001 | Miyamoto | ................ | B66F 9/08 |
| | | | | 187/222 |
| 7,641,577 B2 * | 1/2010 | Markley | ................... | F16H 7/08 |
| | | | | 474/109 |
| 2015/0225217 A1 * | 8/2015 | Koyama | ................. | B66F 9/072 |
| | | | | 187/244 |

FOREIGN PATENT DOCUMENTS

| | | |
|---|---|---|
| DE | 8715958 | 1/1988 |
| DE | 19855202 | 6/1999 |
| DE | 102013004435 A1 | 9/2014 |
| JP | 2001130887 A | 5/2001 |
| WO | 2014/139842 A1 | 9/2014 |

\* cited by examiner

LIFTING ASSEMBLY FOR A LIFT TRUCK, AND LIFT TRUCK

CROSS REFERENCE TO RELATED APPLICATION

This application is based upon and claims priority under relevant sections of 35 USC § 119 to German Patent Application No. 10 2015 102 402.0, filed Feb. 20, 2015, the entire contents of which are hereby incorporated by reference.

BACKGROUND OF THE INVENTION

The present invention relates to a lifting assembly for a lift truck with a lifting mast having at least one mast frame and a load part, as well as a lift drive having at least one lifting chain that lifts the mast frame. The lifting chain is attached to the mast frame at a connecting point and is guided across a deflection point. Such lifting assemblies are used for lift trucks, in particular fork lifts.

Lift trucks, or respectively forklifts, with a lifting assembly have lifting masts which make it possible to lift and lower payloads. The lifting masts possess a plurality of mast frames which are mounted and guided within each other, as well as a load part which is usually provided with fork arms. By using a plurality of mast frames, a particularly favorable ratio is achieved of construction height to lift height. Typically, the lifting masts possess two or more mast frames, wherein a common lifting mast consists of three mast frames, i.e., an inner mast frame, a middle mast frame, and an outer mast or column. Such a lifting mast is termed a triple mast. The functioning of such a lifting assembly will be explained with reference to such a triple mast.

The mast frames are driven by means of lift cylinders and lifting chains which initiate to the lifting process. It was revealed that such a combination of lift cylinders and lifting chains yields the greatest advantages. Practically speaking, a lifting chain is a cable because it is able to transmit exclusively tractive forces. The lifting chain is fastened at both ends to connecting elements on the corresponding components, wherein one component is the associated mast frame. Between the connecting points, the lifting chains are deflected at a deflection point with the assistance of one or more chain rollers. The deflection points are chosen to satisfy the lifting function. Normally, such lifting chains consist of metal materials.

With the triple mast, the middle mast frame is, e.g., lifted with two mast lifting cylinders, whereas the inner mast frame is lifted with two mast lifting chains. The load part is lifted with assistance of a free lift cylinder and a free lift chain. The mast lifting chains are fastened at the bottom end of the inner mast frame to connecting points. They are deflected at the top end of the middle mast frame at deflection points by means of chain rollers. The other ends of the lifting chains are fastened in the outer column to connecting points.

During the operation of such lift trucks, or respectively forklifts, the lifting chains oscillate while driving due to unevenness in the roadway. Such oscillation can cause the lifting chains to strike the adjacent components, in particular the associated mast frame. This produces undesirable noise and damage to the mast frame. The noise generated by the chains is produced as individual, sometimes rapid, sequential loud blows.

A mast assembly for a lift truck is known from DE 198 55 202 B4, which has a support for holding a load lifting device, a lift drive for lifting the support with a lifting chain connected to the support, a guide mast on which the support is guided, and a oscillation limiter arranged on the guide mast to limit the oscillating movement of the lifting chain. The oscillation limiter is a type of guide for the lifting chain, i.e., a relative movement occurs between the oscillation limiter and lifting chain. To allow the chain to move past the oscillation limiter, a distance between the components is required, whereby the chain can also still swing within the overlapping area with the oscillation limiter. In this context, the oscillation limiter is attached to the outer mast (column). As mentioned above, the lifting chain and oscillation limiter execute a relative movement in relation to each other.

BRIEF SUMMARY OF THE INVENTION

The lifting assembly provides a design where the lifting chain produces a particularly low noise emission during the operation. According to one embodiment, a lifting assembly of the indicated type includes at least one tensioning component that applies initial tension and is arranged on the mast frame between the connecting point and deflection point of the lifting chain, and deflects the lifting chain out of its direct connecting line defined as a straight line between the connecting point and deflection point. The lifting chain is pushed out of this direct connecting line by the tensioning component, and the lifting chain lies against the tensioning component under initial tension. By means of this solution, the noise emission in the lifting assembly which arises while driving from striking lifting chains is reduced as the lifting chains are prevented from striking the profiles and adjacent components, which eliminates a significant source of noise in a lifting truck or a forklift.

The goal of noise reduction is achieved in that the lifting chain is prevented from oscillating freely in normal operation by the provided tensioning component. The free oscillation of the lifting chain is prevented by pretensioning the lifting chain and shortening the oscillation length of the lifting chain. The oscillating length of the lifting chain is the length of the lifting chain between the attachment point and the tensioning component and the deflection point and the tensioning component. The initial tension and the shortening of the oscillating length of the lifting chain is realized by deflecting the lifting chain out of the direct connecting line between the connecting point and the deflection point by means of a tensioning component, which will be termed a lifting chain stabilizer in this context.

The lifting chain stabilizer is fastened to the mast frame which is lifted by the lifting chain to which the lifting chain itself is fastened. Accordingly, no relative movement arises during the lifting process between the lifting chain, the lifting chain stabilizer, and the mast frame (as all components lie against each other).

As a consequence of the deflection of the lifting chain out of the direct connecting line between the connecting point and the deflection point as well as the initial tension of the chain, the lifting chain can only flap around after the initial tension has been overcome. As a result, the lifting chain only lifts off of its predetermined contact points and can strike other components in the event of major jarring. In addition, the lifting chain can only lift off to one side due to the deflection of the lifting chain by the lifting chain stabilizer. The normal jarring caused by driving the lift truck is not enough to sufficiently induce the lifting chain to strike against other components.

By means of the lifting chain stabilizer provided, a shortening of the oscillation length of the corresponding lifting chain is achieved, which causes the oscillating chain to possess a higher frequency. At higher frequencies, the amplitudes of the corresponding oscillations are less so that the lifting chain automatically strikes against the adjacent components less frequently or not at all (and less forcefully as well) due to the smaller excursions (amplitudes) of the lifting chain.

Without the provided lifting chain stabilizer, the lifting chain can oscillate over its entire length between the connecting point and the deflection point. This oscillation length is shortened by the lifting chain stabilizer so that the lifting chain length between the connecting point and deflection point is divided into two sections by the lifting chain stabilizer. Accordingly, each partial section is shorter than the original oscillation length. One partial section lies above the lifting chain stabilizer, and the other partial section lies below the lifting chain stabilizer.

It is noted that the invention is not restricted to the arrangement of a single component, i.e., a single lifting chain stabilizer. Instead, a plurality of lifting chain stabilizers can be provided so that the lifting chain is divided into a corresponding number of sections.

The provided lifting chain stabilizer can be located between the lifting chain and the mast frame which is raised by the lifting chain. The lifting chain stabilizer can be arranged on this mast frame.

In one embodiment, the lifting chain stabilizer is designed in the shape of a block. In particular, it has a contact surface against which the lifting chain lies. Since the lifting chain stabilizer moves together with the associated mast frame and the lifting chain, no relative movement occurs between the contact surface of the lifting chain stabilizer and the lifting chain. This results in very little or no wear of the contact surface.

The lifting chain stabilizer can be designed as a compliant component. The compliance of the tensioning component can be sufficiently low to cause the aforementioned deflection, but sufficiently large to pass through the area between the deflection point of the lifting chain and the mast frame. The lifting chain stabilizer is preferably compliant because, during the lifting process, it passes by the deflection of the lifting chain (the area between the deflection point and mast frame) where the lifting chain stabilizer is pinched.

The lifting chain stabilizer passes by the area between the deflection point of the lifting chain and the mast frame when the mast frame is lifted. Since this area is generally only slightly wider than the width of the lifting chain, the compliant lifting chain stabilizer, which should be designed wider than the lifting chain to cause a corresponding deflection of the lifting chain, is compliant, or respectively elastic, enough to pass through this narrow area together with the lifting chain.

The compliant behavior of the compliant lifting chain stabilizer can be achieved by means of its shape and/or its material. The compliance of the lifting chain stabilizer can be achieved in that it can consist of an elastic material or contains such a material. The compliance can, however, also be exclusively achieved by the shape of the lifting chain stabilizer or a combination of the shape and material. Leading angles, cutouts, roundings, undercuts, or any other feature capable of increasing the compliance of the lifting chain stabilizer may be used in the design of the lifting chain stabilizer.

In one embodiment, the tensioning component is located at approximately half the distance between the connecting point and deflection point when the mast frame is in a retracted state. When the distance between said points of the lifting chain is longer, a plurality of lifting chain stabilizers can be used. The installation height should be accordingly selected, such as divided into equal sections.

In one design, two or more compliant lifting chain stabilizers can be provided to deflect the chain at several points.

In any event, the chosen thickness of the lifting chain stabilizer should be such that the lifting chain is pushed away from the mast frame, whereby the chain is deflected out of the direct connecting line.

In one embodiment, the lifting chain stabilizer can form a guide for the lifting chain. As already noted, no relative movement occurs between the lifting chain and the compliant lifting chain stabilizer. Accordingly, the guide prevents the lifting chain from jumping to the side of the lifting chain stabilizer. For this purpose, the compliant lifting chain stabilizer can possess edges arranged on the side of the lifting chain, preferably next to a contact surface for the lifting chain, which prevent the lifting chain from jumping off to the side of the lifting chain stabilizer.

In one embodiment, the lifting chain stabilizer is adhered to the mast frame. The advantage of adhesion is that no mechanical fasteners need to be incorporated on the mast profile. Adhesion also offers sufficient retention due to the initial tension on the lifting chain stabilizer from the lifting chain.

The invention furthermore relates to a lift truck, in particular a forklift, which has a lifting assembly with the above-described features.

BRIEF DESCRIPTION OF THE DRAWINGS

The invention will be explained in detail below with reference to an exemplary embodiment in conjunction with the drawings. In the figures.

DETAILED DESCRIPTION OF THE INVENTION

Figure 1:
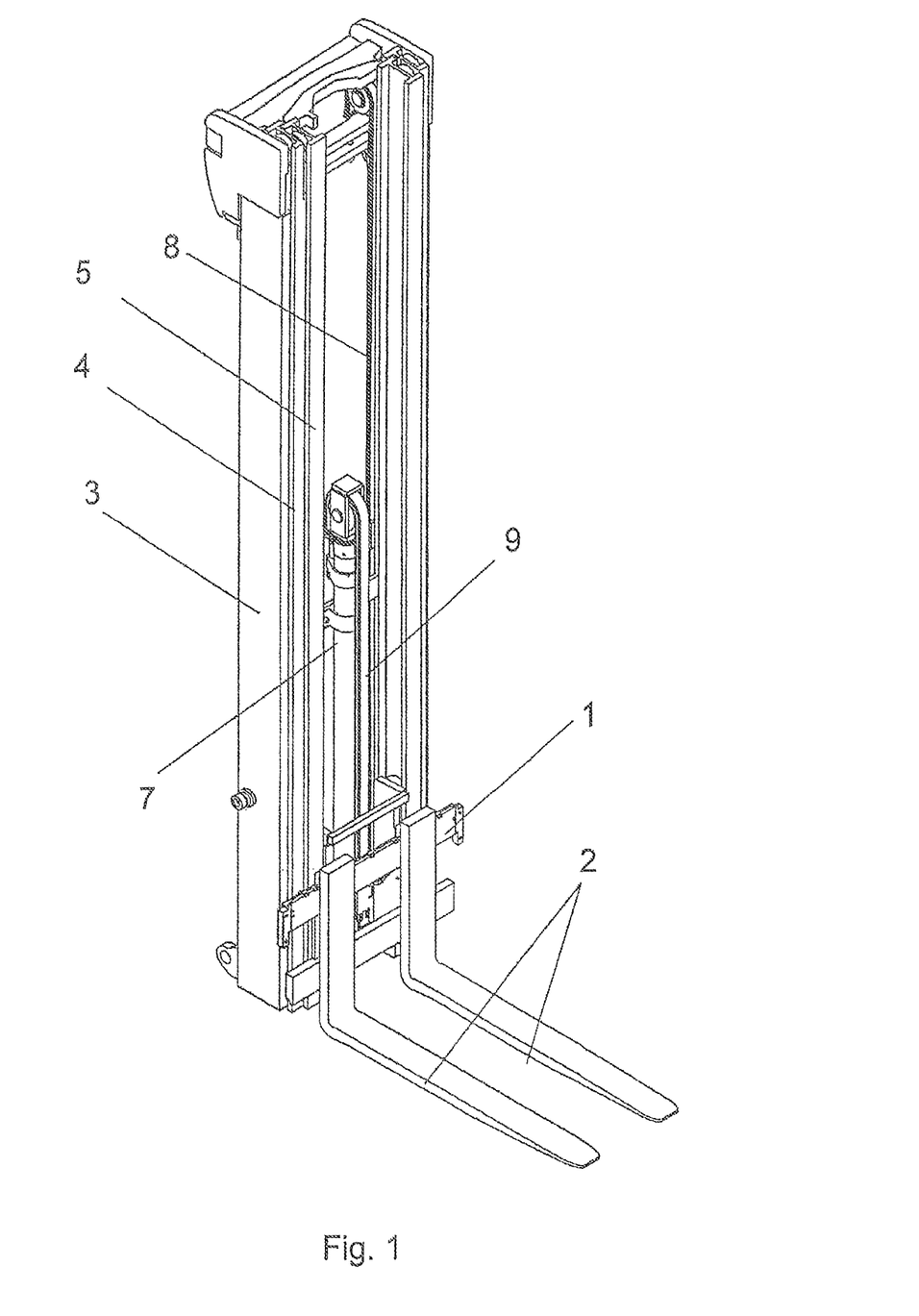
FIG. 1 shows a spatial representation of a lifting mast at an angle from the front with a retracted mast frame.
Figure 2:
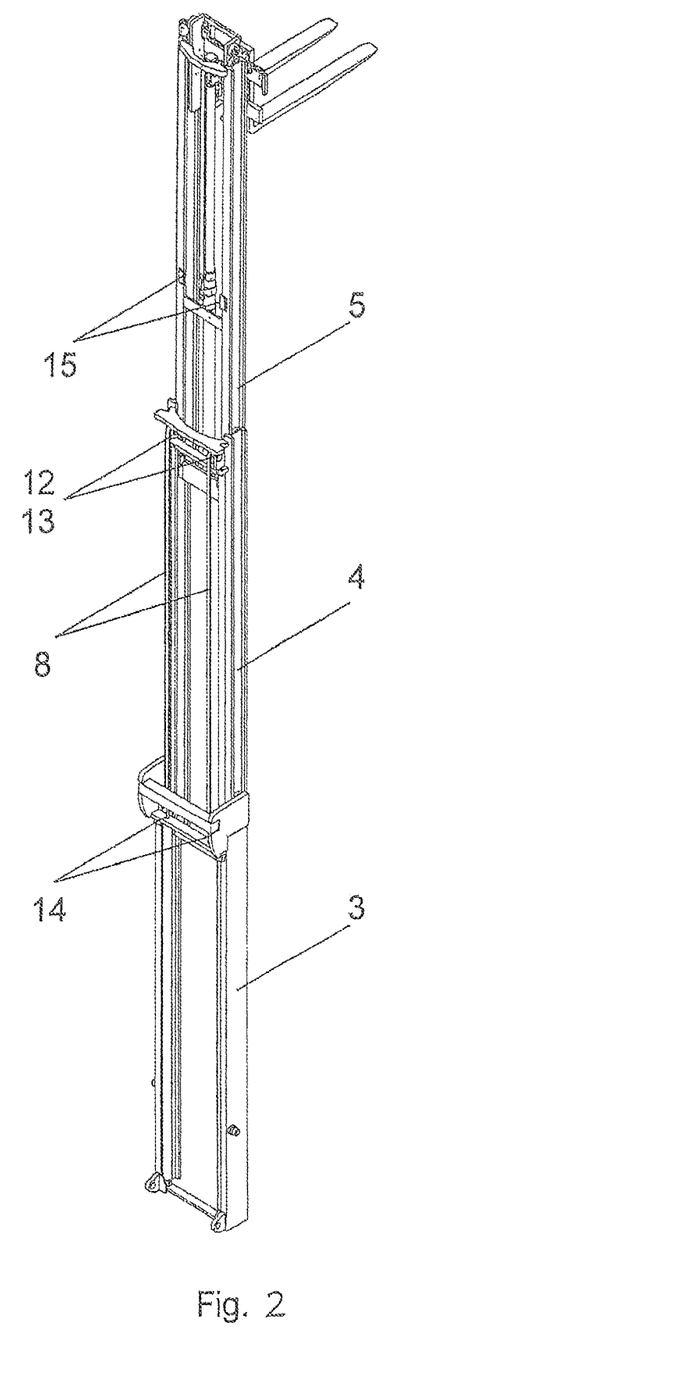
FIG. 2 shows a spatial representation of a lifting mast at an angle from behind with an extended mast frame.

The lifting mast depicted in FIG. 1 of a lifting assembly for a forklift is designed as a triple mast, and possesses a lifting mast frame 4 which is lifted by two mast lifting cylinders 6 (shown in FIG. 3), an inner mast frame 5 which is lifted with two mast lifting chains 8, and an outer column 3. The corresponding mast frames are mounted within each other and guided within each other. Furthermore, the lifting mast possesses a load part 1 with fork arms 2 on which a payload to be lifted or lowered is arranged. The load part 1 is lifted with assistance of a free lift cylinder 7 and a free lift chain 9. The mast lifting chains 8 are fastened at the bottom end of the inner mast frame 5 to connecting points 11 (see FIG. 3). At the top end of the middle mast frame 4, they are deflected at deflection points 12 across chain rollers 13 as shown in FIG. 2. The other end of the respective lifting chain 8 is fastened within the column 3 at a connecting point 14 as shown in FIG. 2.

FIG. 2 shows the lifting mast from FIG. 1 in an almost entirely extended state which has reached its maximum lifting height. One can see the furthest extended inner mast frame 5 with the associated lifting chains 8, as well as the deflection points 12 of the lifting chains 8 formed by the chain rollers 13. Likewise, the connecting points 14 of the lifting chains 8 on the column 3 are discernible.

Figure 3:
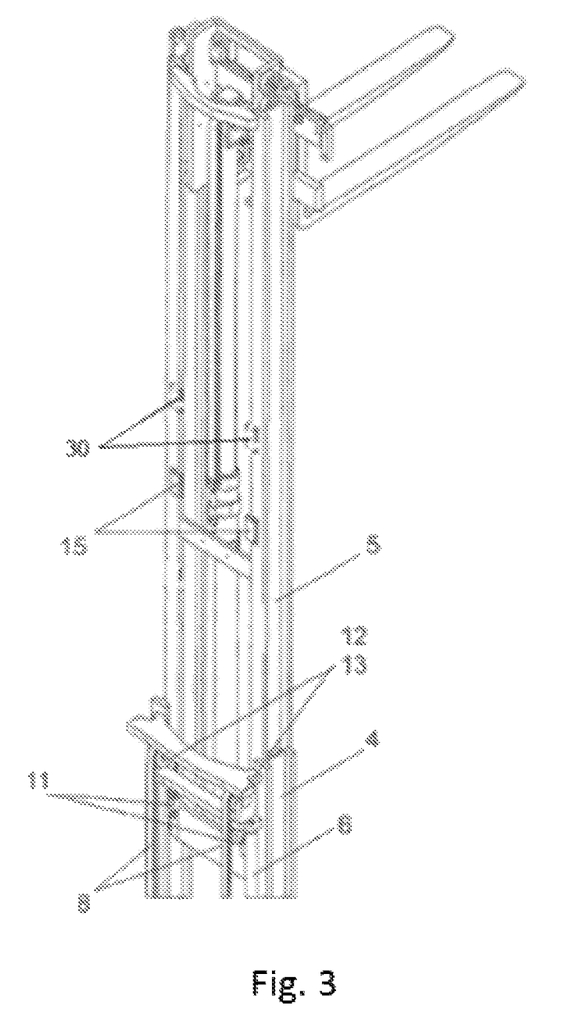
FIG. 3 shows an enlarged view of a part of FIG. 2.

FIG. 3 shows an enlarged view of a part of FIG. 2. It can be seen that two lifting chain stabilizers 15 are arranged on the rear of the inner mast frame 5, i.e., the two double-T profiles thereof. Each lifting chain stabilizer 15 is compliant, or respectively elastic and is designed in the shape of a block or plate.

Figure 4:
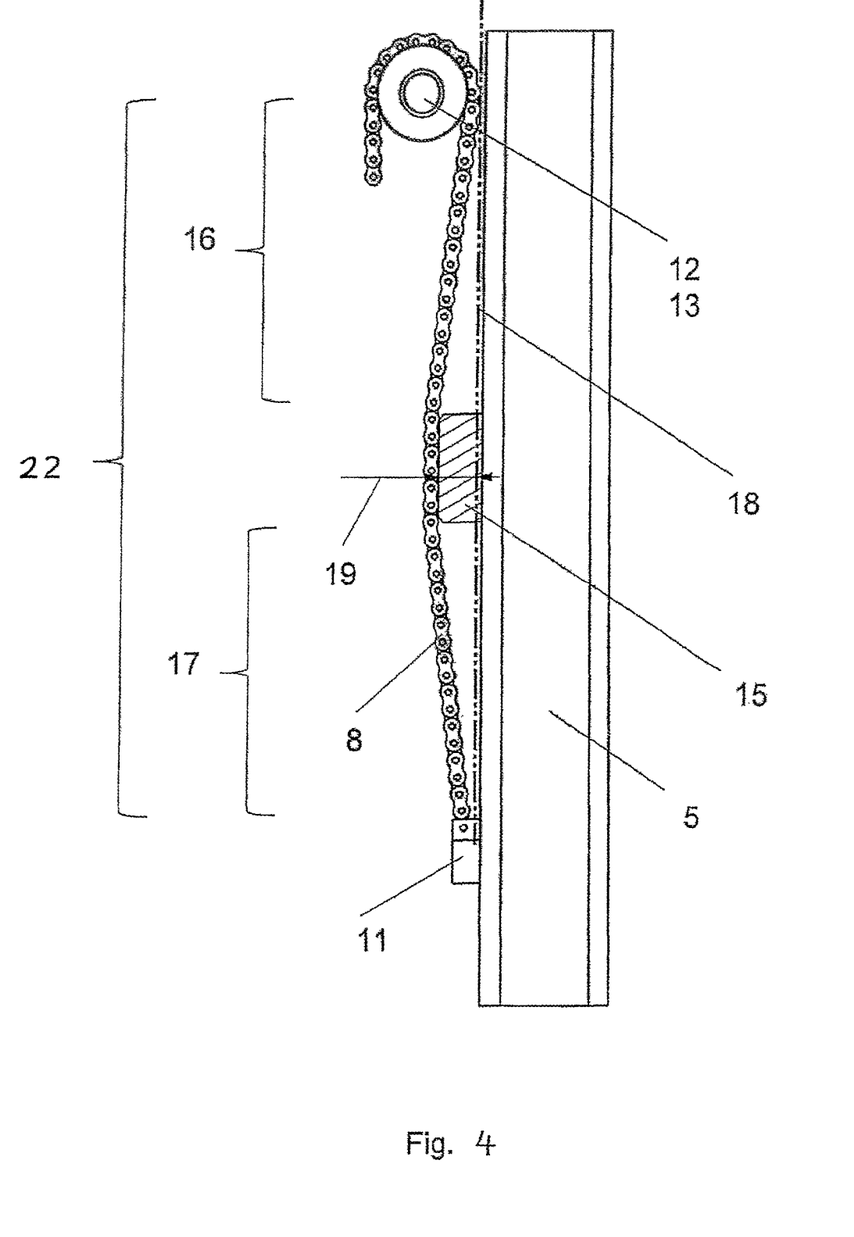
FIG. 4 shows an enlarged partial side view of the lifting mast.

A lifting chain stabilizer 15 is represented in an enlarged scale in the enlarged partial side view in FIG. 4. In this representation, the inner mast frame is in a retracted state such that the lifting chain stabilizer 15 contacts the corresponding lifting chain 8. The lifting chain 8 is deflected by means of the lifting chain stabilizer 15 from its direct connecting line 18 between its connecting point 11 and its deflection point 12 as shown at 19. The lifting chain stabilizer 15 is located between the lifting chain 8 and the inner mast frame 5 which is raised by the lifting chain 8. When the inner mast frame 5 is in the retracted state, the lifting chain stabilizer is arranged approximately at one-half the length between the deflection point 12 and the connecting point 11. The lifting chin stabilizer possesses a thickness such that the lifting chain 8 is pushed away from the inner mast frame 5. This prevents the lifting chain 8 from oscillating freely during normal forklift operation. This is realized by the pretensioned lifting chain 8, and the shortened oscillation length of the lifting chain. Noise reduction is thereby achieved since the tendency of the lifting chain to strike against adjacent components is reduced.

The lifting chain stabilizer 15 is designed as a compliant, or respectively elastic, component since, during extension and retraction of the inner mast frame 5, the lifting chain stabilizer 15 passes the deflection point 12 together with the lifting chain 8, i.e., through the gap between the deflection point 12 and mast frame 5 during which it is compressed (approximately by the amount of the deflection 19 of the lifting chain 8).

In FIG. 4, length 22 indicates the distance between the connecting point 11 and the deflection point 12 of the lifting chain 8. This length 22 is divided by the lifting chain stabilizer 15 into two sections 16, 17, whereby the oscillation length of the lifting chain is halved. In other embodiments, a pair of second tensioning components 30 (shown in phantom in FIG. 3) may be disposed on the first mast frame 5 between the connecting and deflection points to divide the sections into several sections, thereby reducing the oscillation length of each section yet further, i.e.

Since no relative movement occurs between the lifting chain 8 and the lifting chain stabilizer 15, abrasion also does not occur on the contact surface of the lifting chain stabilizer with the lifting chain.

Figure 5:
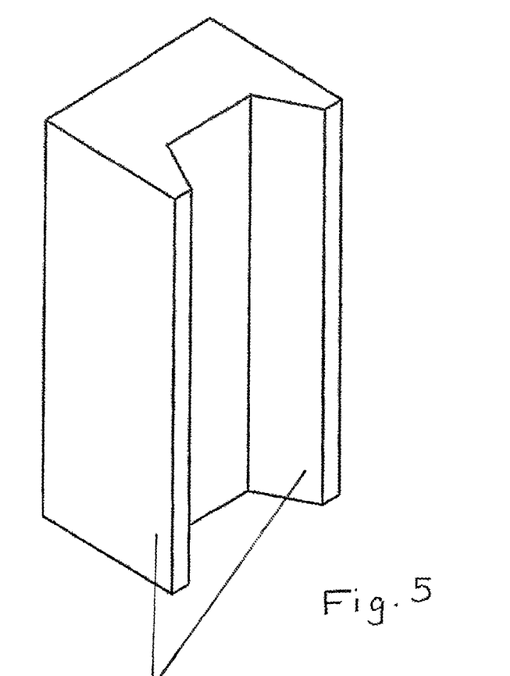
FIG. 5 shows a spatial representation of an embodiment of a lifting chain stabilizer.
Figure 6:
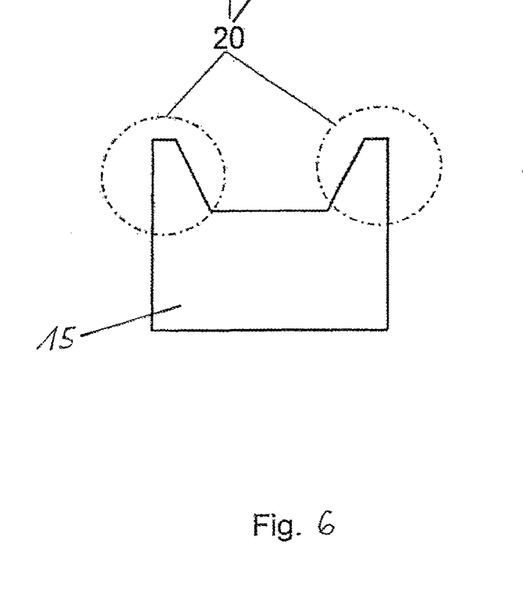
FIG. 6 shows a plan view of the lifting chain stabilizer from FIG. 5.

FIGS. 5 and 6 show an embodiment of a lifting chain stabilizer that is provided with a lateral guide for the lifting chain. This lateral guide is formed by two edges 20 which accommodate the lifting chain 8 between themselves. The edges 20 shown in a plan view in FIG. 6 prevent the lifting chain from jumping off the lifting chain stabilizer to the side.

Figure 7:
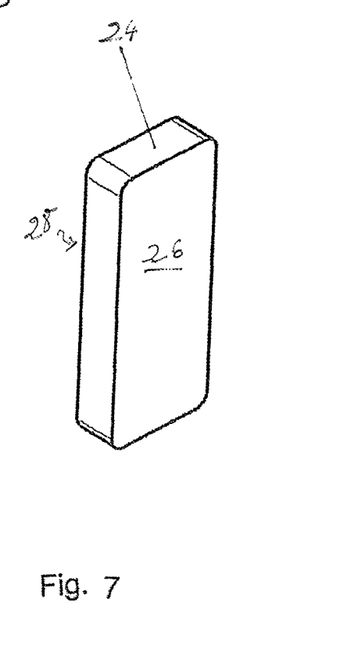
FIG. 7 shows a perspective view of an alternative design of a lifting chain stabilizer.

FIG. 7 shows an alternative embodiment of the lifting chain stabilizer 24 in a perspective view. The lifting chain stabilizer 24 possesses a rectangular contour, one flat side 26 of which serves as a contact surface for the lifting chain, and the opposing flat side 28 of which serves as an adhesive surface for attaching to the lifting mast.

The invention claimed is:

1. A lifting assembly for a lift truck, the lifting assembly comprising:
  a lifting mast comprising a plurality of mast frames mounted and guided in each other;
  a load part;
  a lift drive comprising at least one lifting chain attached to a first mast frame of the plurality of mast frames at a connecting point on the first mast frame and guided across a chain roller on another mast frame; and
  a tensioning component located on the first mast frame between the connecting point and the chain roller, the tensioning component configured to apply tension on the lifting chain and deflect the lifting chain out of a direct connecting line between the connecting point and a deflection point defined by the chain roller;
  wherein the tensioning component comprises a shape of a block and being located at approximately half the distance between the connecting and deflection points when the first mast frame is in a retracted state;
  wherein the tensioning component engages the lifting chain in the retracted state and disengages the lifting chain in an extended state.

2. The lifting assembly according to claim 1, wherein the tensioning component comprises a compliant material to configure the tensioning component to pass through an area between the deflection point of the lifting chain and the first mast frame.

3. The lifting assembly according to claim 1, further comprising a second tensioning component located on the first mast frame between the connecting point and the deflection point.

4. The lifting assembly according to claim 1, wherein the shape of the tensioning component comprises leading angles, cutouts, roundings, or undercuts to configure the tensioning component to pass through an area between the deflection point of the lifting chain and the first mast frame.

5. The lifting assembly according to claim 1, wherein the tensioning component comprises a guide for the lifting chain.

6. The lifting assembly according to claim 5, wherein the guide comprises a contact surface for the lifting chain and two edges arranged on the side of the contact surface.

7. The lifting assembly according to claim 1, wherein the tensioning component is adhered to the first mast frame.

8. A lift truck comprising:
  a lifting assembly comprising:
    a lifting mast comprising a plurality of mast frames mounted and guided in each other;
    a load part;
    a lift drive comprising at least one lifting chain attached to a first mast frame of the plurality of mast frames at a connecting point on the first mast frame and guided across a chain roller on another mast frame; and
    a tensioning component located on the first mast frame between the connecting point and the chain roller, the tensioning component configured to apply tension on the lifting chain and deflect the lifting chain out of a direct connecting line between the connecting point and a deflection point defined by the chain roller;

wherein the tensioning component comprises a shape of a block and being locate at approximately half the distance between the connecting and deflection points when the first mast frame is in a retracted state;

wherein the tensioning component engages the lifting chain in the retracted state and disengages the lifting chain in an extended state.

9. The lift truck according to claim 8, wherein the tensioning component comprises a compliant material to configure the tensioning component to pass through an area between the deflection point of the lifting chain and the first mast frame.

10. The lift truck according to claim 8, further comprising a second tensioning component located on the first mast frame between the connecting point and the deflection point.

11. The lift truck according to claim 8, wherein the shape of the tensioning component comprises leading angles, cutouts, roundings, or undercuts to configure the tensioning component to pass through an area between the deflection point of the lifting chain and the first mast frame.

12. The lift truck according to claim 8, wherein the tensioning component comprises a guide for the lifting chain.

13. The lift truck according to claim 12, wherein the guide comprises a contact surface for the lifting chain and two edges arranged on the side of the contact surface.

14. The lift truck according to claim 8, wherein the tensioning component is adhered to the first mast frame.

15. A lifting assembly for a lift truck, the lifting assembly comprising:

a lifting mast comprising a plurality of mast frames mounted and guided in each other;

a load part;

a lift drive comprising at least one lifting chain attached to a first mast frame of the plurality of mast frames at a connecting point on the first mast frame and guided across a chain roller on another mast frame; and a tensioning component located on the first mast frame between the connecting point and the chain roller, the tensioning component configured to apply tension on the lifting chain and deflect the lifting chain out of a direct connecting line between the connecting point and a deflection point defined by the chain roller;

wherein the tensioning component engages the lifting chain in a retracted state and disengages the lifting chain in an extended state.

16. The lifting assembly according to claim 15 wherein the tensioning component is disposed approximately midway between the connecting point and the deflection point when the lifting chain is in the retracted state.

17. The lifting assembly according to claim 15, further comprising a second tensioning component located on the first mast frame between the connecting point and the deflection point.

18. The lifting assembly according to claim 15, wherein the tensioning component is adhered to the first mast frame.

19. The lifting assembly according to claim 15, wherein the tensioning component forms the shape of a block.

* * * * *